United States Patent
Guo

(10) Patent No.: US 10,963,667 B2
(45) Date of Patent: Mar. 30, 2021

(54) UNDER-SCREEN BIOMETRIC IDENTIFICATION APPARATUS AND ELECTRONIC DEVICE

(71) Applicant: SHENZHEN GOODIX TECHNOLOGY CO., LTD., Shenzhen (CN)

(72) Inventor: Yiping Guo, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 2 days.

(21) Appl. No.: 16/658,055

(22) Filed: Oct. 19, 2019

(65) Prior Publication Data

US 2020/0050822 A1 Feb. 13, 2020

Related U.S. Application Data

(63) Continuation of application No. PCT/CN2018/098329, filed on Aug. 2, 2018.

(51) Int. Cl.
*G06K 9/00* (2006.01)
*G06F 21/32* (2013.01)

(52) U.S. Cl.
CPC ......... *G06K 9/00046* (2013.01); *G06F 21/32* (2013.01); *G06K 9/00053* (2013.01)

(58) Field of Classification Search
CPC ........... G06K 9/00046; G06K 9/00053; G06K 9/209; G06K 9/0004; G06F 21/32; H01L 2224/73265; H01L 2224/48091
See application file for complete search history.

(56) References Cited

U.S. PATENT DOCUMENTS

| 10,489,629 B1 | 11/2019 | Jiang et al. |
| 2010/0079657 A1 | 4/2010 | Yamazaki et al. |
| 2011/0085072 A1 | 4/2011 | Jung |
| 2017/0212613 A1 | 7/2017 | Hwang et al. |
| 2018/0348438 A1 | 12/2018 | Gao |
| 2018/0365472 A1 | 12/2018 | Cai |
| 2020/0012835 A1* | 1/2020 | Jiang ............... G02B 13/0025 |

(Continued)

FOREIGN PATENT DOCUMENTS

| CN | 101655614 A | 2/2010 |
| CN | 101276406 B | 5/2011 |
| CN | 102043947 A | 5/2011 |

(Continued)

*Primary Examiner* — Abhishek Sarma

(57) ABSTRACT

Provided are an under-screen biometric identification apparatus and an electronic device. The under-screen biometric identification apparatus includes: a lens disposed under a display screen for receiving an optical signal from above the display screen and formed by reflection of a human finger, where the optical signal is used to detect biometric information of the finger; a lens barrel, where the lens is fixed in the lens barrel; and a sensing chip disposed under the lens barrel for imaging based on an optical signal passing through the lens, where a distance between a photosurface of the sensing chip and an imaging surface of the lens is greater than or equal to a preset value. An under-screen biometric identification apparatus and an electronic device provided in embodiments of the present application can improve the efficiency of under-screen biometric identification.

20 Claims, 6 Drawing Sheets

(56) References Cited

U.S. PATENT DOCUMENTS

2020/0117876 A1   4/2020  Cai

FOREIGN PATENT DOCUMENTS

| CN | 102782574  | A  | 11/2012 |
| CN | 204390251  | U  | 6/2015  |
| CN | 105956545  | A  | 9/2016  |
| CN | 106156716  | A  | 11/2016 |
| CN | 106961537  | A  | 7/2017  |
| CN | 107004130  | A  | 8/2017  |
| CN | 107092402  | A  | 8/2017  |
| CN | 107193412  | A  | 9/2017  |
| CN | 107305411  | A  | 10/2017 |
| CN | 107547777  | A  | 1/2018  |
| CN | 108323207  | A  | 7/2018  |
| CN | 208607675  | U  | 3/2019  |
| EP | 2169440    | A2 | 3/2010  |
| EP | 3591578    | A1 | 1/2020  |
| JP | 2003050991 | A  | 2/2003  |
| KR | 20150087714| A  | 7/2015  |
| WO | 2016177174 | A1 | 11/2016 |

\* cited by examiner

UNDER-SCREEN BIOMETRIC IDENTIFICATION APPARATUS AND ELECTRONIC DEVICE

CROSS-REFERENCE TO RELATED APPLICATIONS

The present application is a continuation of international application No. PCT/CN2018/098329, filed on Aug. 2, 2018, of which is incorporated herein by reference in its entirety.

TECHNICAL FIELD

Embodiments of the present application relate to the field of biometric identification, and more particularly, to an under-screen biometric identification apparatus and an electronic device.

BACKGROUND

With rapid development of an electronic device industry, especially rapid development of mobile communication devices (such as mobile phones), biometric identification technology has received more and more attention from people, and practical usage of more convenient under-screen biometric identification technology, such as under-screen fingerprint identification technology, has become a popular requirement.

At present, under-screen optical fingerprint identification technology mainly includes under-screen optical fingerprint identification technology based on a periodic micro-hole array and under-screen optical fingerprint identification technology based on an integrated micro lens. The former optical fingerprint identification technology is susceptible to Moire fringes, and an optical fingerprint identification module needs to be attached under an OLED screen, while the process is complicated. A fingerprint identification module of the latter under-screen optical fingerprint identification technology is integrated, and therefore a precision requirement of the entire optical fingerprint identification module is very high in a mass production process, whereas common processing technology is basically insufficient to meet actual needs. Due to the existence of the above various problems, the efficiency of under-screen biometric identification is affected.

Therefore, how to improve the efficiency of under-screen biometric identification has become a technical problem to be solved.

SUMMARY

Provided are an under-screen biometric identification apparatus and an electronic device, which could improve the efficiency of under-screen biometric identification.

In a first aspect, provided is an under-screen biometric identification apparatus, including:

a lens disposed under a display screen for receiving an optical signal from above the display screen and formed by reflection of a human finger, where the optical signal is used to detect biometric information of the finger;

a lens barrel, where the lens is fixed in the lens barrel; and a sensing chip disposed under the lens barrel for imaging based on an optical signal passing through the lens, where a distance between a photosurface of the sensing chip and an imaging surface of the lens is greater than or equal to a preset value.

In some possible implementations, the imaging surface of the lens is located above or below the photosurface of the sensing chip.

In some possible implementations, the preset value is 10 μm.

In some possible implementations, the lens includes a lens consisting of at least one piece of aspherical injection molding optic.

In some possible implementations, the lens is a macro lens.

In some possible implementations, a focal length of the macro lens ranges from 0.4 mm to 1.8 mm.

In some possible implementations, a lower surface of the lens barrel extends downward at a barrel opening of the lens barrel to form a first fixing structure, the lower surface of the lens barrel extends downward at an edge of the lens barrel to form a second fixing structure, the lens barrel forms a cavity between the first fixing structure and the second fixing structure, and the lens is fixed in the first fixing structure.

In some possible implementations, an upper surface of the first fixing structure extends inward at the barrel opening of the lens barrel to form a first convex structure, and the first convex structure is used for fixing the lens.

In some possible implementations, the upper surface of the first fixing structure is provided with a bevel angle formed by chamfering processing at the barrel opening such that an inner diameter of the first fixing structure at the upper surface is greater than an inner diameter of the first fixing structure at the first convex structure.

In some possible implementations, an inner side surface of the first fixing structure is provided with a first step structure formed under the first convex structure, and the lens is fixed in the first fixing structure through the first convex structure and the first step structure.

In some possible implementations, the under-screen biometric identification apparatus further includes:

an optical filter located between the lens barrel and the sensing chip, where the optical filter is fixed on an upper surface of the sensing chip, and at least covers a lower surface of the first fixing structure by means of direct contact with a bottom of the lens barrel.

In some possible implementations, the under-screen biometric identification apparatus further includes:

a flexible printed circuit board, where the sensing chip is fixed on an upper surface of the flexible printed circuit board, and a lower surface of the second fixing structure is fixedly connected to the upper surface of the flexible printed circuit board in an edge area of the sensing chip.

In some possible implementations, the lens barrel is sealedly bonded by means of dispensing fixing glue on the flexible printed circuit board.

In some possible implementations, the lens barrel is provided with a vent hole for adjusting an atmospheric pressure intensity of an internal space formed by the lens barrel and the flexible printed circuit board.

In some possible implementations, the under-screen biometric identification apparatus further includes:

a fixing support, where the lens barrel is fixed under the display screen by the fixing support such that a distance between an upper surface of the display screen and an optical center of the lens satisfies an imaging condition.

In some possible implementations, the fixing support and the lens barrel are fixed by at least one of the following mounting methods: a screw mounting and fixing method, and an adhesive attaching and fixing method, a welding and fixing method and a coupling and fixing method.

In some possible implementations, the under-screen biometric identification apparatus further includes:

a lens base for supporting the lens barrel.

In some possible implementations, a dispensing structure is formed between the lens base and the lens barrel, and the lens base and the lens barrel are fixed by means of dispensing glue in the dispensing structure.

In some possible implementations, the dispensing structure includes: a second step structure formed by an upper surface of the lens base extending downward in a peripheral area close to the lens barrel.

In some possible implementations, a lower surface of the lens base extends downward in a peripheral area close to the lens barrel to form a third fixing structure surrounding and fixing the lens barrel, and a bottom of the third fixing structure is in a suspending state.

In some possible implementations, the lower surface of the lens base extends downward at an edge of the lens base away from the lens barrel to form a fourth fixing structure, where a downward extension height of the fourth fixing structure is greater than a downward extension height of the third fixing structure.

In some possible implementations, an upper surface of the lens barrel extends inward at a barrel opening to form a second convex structure, and the second convex structure is used for fixing the lens.

In some possible implementations, the upper surface of the lens barrel is provided with a bevel angle formed by chamfering processing at the barrel opening such that an inner diameter of the lens barrel at the upper surface is greater than an inner diameter of the lens barrel at the second convex structure.

In some possible implementations, an inner side surface of the lens barrel is provided with a third step structure formed under the second convex structure, and the lens is fixed in the lens barrel through the second convex structure and the third step structure.

In some possible implementations, the under-screen biometric identification apparatus further includes:

an optical filter located between the lens barrel and the sensing chip, where the optical filter is fixed on an upper surface of the sensing chip, and at least covers a lower surface of the lens barrel by means of direct contact with a bottom of the lens barrel.

In some possible implementations, the under-screen biometric identification apparatus further includes:

a flexible printed circuit board, where the sensing chip is fixed on an upper surface of the flexible printed circuit board, and a lower surface of the lens base is fixedly connected to the upper surface of the flexible printed circuit board in an edge area of the sensing chip.

In some possible implementations, the under-screen biometric identification apparatus further includes:

a steel plate, where the steel plate is fixed on a lower surface of the flexible printed circuit board.

In some possible implementations, the lens base is sealedly bonded by means of dispensing fixing glue on the flexible printed circuit board.

In some possible implementations, the lens base is provided with a vent hole for adjusting an atmospheric pressure intensity of an internal space formed by the lens base and the flexible printed circuit board.

In some possible implementations, the under-screen biometric identification apparatus further includes:

a fixing support, where the lens base is fixed under the display screen by the fixing support such that a distance between an upper surface of the display screen and an optical center of the lens satisfies an imaging condition.

In some possible implementations, the fixing support and the lens base are fixed by at least one of the following mounting methods: a screw mounting and fixing method, and an adhesive attaching and fixing method, a welding and fixing method and a coupling and fixing method.

In some possible implementations, the sensing chip is fixed on the upper surface of the flexible printed circuit board by die attached epoxy, and the sensing chip is electrically connected to the flexible printed circuit board by a bonding wire.

In some possible implementations, the fixing glue has at least one of the following characteristics: opaque to visible light, a thickness of 0.02 mm~0.10 mm, viscosity greater than 20000 mPas and a curing shrinkage percentage less than 3%.

In some possible implementations, the fixing glue is glue of epoxy systems or acrylic systems.

In some possible implementations, the optical filter is an infrared cut optical filter and/or a blue light cut optical filter.

In some possible implementations, the optical filter is fixed on the sensing chip by an optical adhesive.

In some possible implementations, the under-screen biometric identification apparatus is applied to an electronic device, the fixing support is a middle frame of the electronic device, and the middle frame is used for supporting the display screen.

In some possible implementations, the middle frame is provided with a hole, the lens barrel is at least partially accommodated in the hole, and there is a gap between an outer side of the lens barrel and an inner side of the hole.

In some possible implementations, an upper surface of the middle frame is provided with a bevel angle formed by chamfering processing at an edge of the hole, and the bevel angle enables a width of the hole on the upper surface of the middle frame to be larger than a width of the hole on a lower surface of the middle frame.

In a second aspect, provided is an electronic device, including:

the under-screen biometric identification apparatus of the first aspect.

In some possible implementations, the electronic device further includes:

a display screen, where the under-screen biometric identification apparatus is disposed under the display screen such that a distance between an upper surface of the display screen and an optical center of a lens in the under-screen biometric identification apparatus satisfies a predetermined imaging condition, where a biometric capturing area of the under-screen biometric identification apparatus is at least partially located in a display area of the display screen.

In some possible implementations, the electronic device further includes: a middle frame, where the under-screen biometric identification apparatus is assembled under the display screen through the middle frame so that there is a gap between the under-screen biometric identification apparatus and the display screen.

In some possible implementations, the electronic device further includes a screen component flexible circuit board, the screen component flexible circuit board is located between the display screen and the middle frame, and the screen component flexible circuit board and the middle frame are sealed and fixed by a compressible foam that is provided with an adhesive on at least one side.

In some possible implementations, if the foam is provided with adhesives on two sides, viscosity of an adhesive for bonding and attaching the foam and the screen component flexible circuit board is weaker than viscosity of an adhesive for bonding and attaching the foam and the middle frame.

In some possible implementations, a compression percentage of the foam is greater than 50%.

On one hand, in embodiments of the present application, by controlling assembly sizes (or an assembly size) of a lens barrel and/or an optical filter, a distance between a photosurface of a sensing chip and an imaging surface of a lens is enabled to be greater than or equal to a preset value, that is, the photosurface of the sensing chip may be in a defocusing state, and thus desired optical imaging is achieved, thereby reducing requirements of processing technology, also solving a problem of a batch yield of an integrated module in a production assembly process and a problem that an optimal focal length of the integrated module cannot be precisely aligned, and further, improving the efficiency of under-screen biometric identification.

On the other hand, an optical fingerprint identification module is avoided to be attached to a lower surface of a display screen, and only an under-screen biometric identification apparatus needs to be disposed under the display screen. Particularly, a lens is disposed under the display screen, which effectively simplifies a mounting process of the under-screen biometric identification apparatus, improves a batch yield in the process of mounting the under-screen biometric identification apparatus, reduces a damage rate in a replacement process of the under-screen biometric identification apparatus, and further, reduces costs effectively.

DESCRIPTION OF EMBODIMENTS

The technical solutions in embodiments of the present disclosure will be described hereinafter in conjunction with the attached drawings.

As a smart terminal enters an era of full screen, a biometric capturing area on the front of an electronic device is squeezed by the full screen, and therefore, under-display or under-screen biometric identification technology has gained an increasing attention. The under-screen biometric identification technology refers to mounting an under-screen biometric identification apparatus (such as a fingerprint identification module) under a display screen, thereby realizing a biometric identification operation inside a display area of the display screen, without setting a biometric capturing area in an area on the front of an electronic device other than the display area.

The under-screen biometric identification technology may include under-screen optical biometric identification technology, under-screen ultrasonic biometric identification technology, or other types of under-screen biometric identification technology.

Taking the under-screen optical biometric identification technology as an example, the under-screen optical biometric identification technology uses light returned from a top surface of a display component of a device for fingerprint sensing and other sensing operations. The returned light carries information of an object (e.g., a finger) in contact with the top surface, and a particular optical sensor module located under a display screen is implemented by capturing and detecting the returned light. The particular optical sensor module may be designed to achieve desired optical imaging by properly configuring an optical element for capturing and detecting a returned light.

It should be understood that technical solutions of embodiments of the present application can be applied to various electronic devices, and more particularly, to an electronic device having a display screen, for example, portable or mobile computing devices such as a smart phone, a notebook computer, a tablet computer and a game device, and other electronic devices such as an electronic database, an automobile and an automated teller machine (ATM), which is not limited in the embodiments of the present application.

It should also be understood that the technical solutions of the embodiments of the present application can perform other biometric identification in addition to fingerprint identification, for example, living body identification and the like, which is not limited in the embodiments of the present application.

Figure 1:
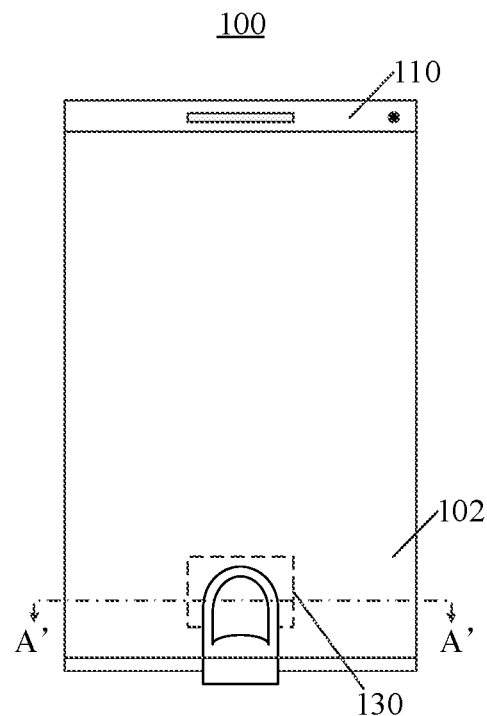
FIG. 1 is a schematic plan view of a mobile terminal to which the present application is applicable.
Figure 2:
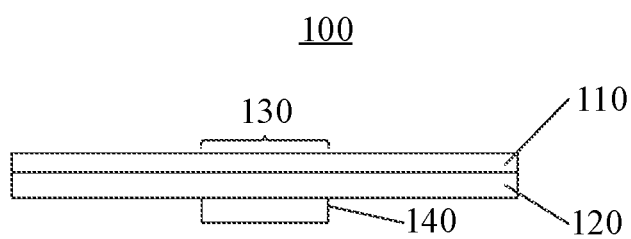
FIG. 2 is a partial schematic cross-sectional view of the mobile terminal shown in FIG. 1.

FIG. 1 and FIG. 2 are schematic views showing an electronic device 100 to which an under-screen biometric identification apparatus is applicable. FIG. 1 is schematic front view of an electronic device 100 to which an under-screen biometric identification apparatus is applicable, and FIG. 2 is a partial schematic cross-sectional structural view of the electronic device 100 shown in FIG. 1 taken along A'-A'.

As shown in FIG. 1 and FIG. 2, the electronic device 100 may include a display screen 120 and an under-screen biometric identification apparatus 140; and the display screen 120 has a display area 102, and the under-screen biometric identification apparatus 140 is disposed under the display screen 120.

The display screen 120 may be a self-emitting display screen that employs a self-emitting display unit as a display pixel. For example, the display screen 120 may be an organic light-emitting diode (OLED) display screen or a micro light-emitting diode (micro-LED) display screen. In other alternative embodiments, the display screen 120 may also be a liquid crystal display (LCD) screen or another passive light-emitting display screen, which is not limited in the embodiments of the present application.

The display screen 120 may be specifically a touch display screen, and the touch display screen may not only display a screen but also detect a touch or press operation of a user, thereby providing the user with a human-machine interaction interface. For example, in an embodiment, the electronic device 100 may include a touch sensor, and the touch sensor may be specifically a touch panel (TP), which may be disposed on a surface of the display screen 120, or may be partially integrated or entirely integrated into an interior of the display screen 120 to form the touch display screen.

The under-screen biometric identification apparatus 140 may be an optical under-screen biometric identification apparatus, which may include an optical biometric sensor with an optical sensing array, such as an optical fingerprint sensor; and the optical sensing array includes a plurality of optical sensing units, and an area where the optical sensing array is located is a biometric capturing area of the under-screen biometric identification apparatus 140, and the optical sensing units are used for capturing fingerprint characteristic information (such as fingerprint image information) of a user.

The under-screen biometric identification apparatus 140 may be disposed at least in a partial area under the display screen 120 such that the biometric capturing area (or sensing area) of the under-screen biometric identification apparatus 140 is at least partially located in the display area 102 of the display screen 120.

As shown in FIG. 1, the under-screen biometric identification apparatus 140 has a biometric capturing area 130, and the biometric capturing area 130 is located in the display area 102 of the display screen 120. Therefore, when a user needs to unlock the electronic device or perform other biometric verification, a biometric input operation can be implemented merely by pressing a finger on the biometric capturing area 130 located on the display screen 120. Since biometric capturing detection can be implemented inside the display area 102 of the display screen 120, a front surface of the electronic device 100 in the above structure does not need to reserve space to set a fingerprint button (such as a Home button), so that a full screen solution can be adopted. That is, the display area 102 of the display screen 120 can be substantially extended to the entire front surface of the electronic device 100.

In the biometric identification process, the display screen 120 adopting the OLED display screen is taken as an example, the display screen 120 has OLED display units distributed in an array, and the under-screen biometric identification apparatus 140 can utilize an OLED display unit (i.e., an OLED light source) of the OLED display 120 located in the biometric capturing area 130 as an excitation light source for biometric detection and identification. Of course, it should be understood that in other alternative implementations, the under-screen biometric identification apparatus 140 may also provide an optical signal for biometric detection and identification by adopting an internal light source or an external light source; and in this case, the under-screen biometric identification apparatus can be applied not only to a self-emitting display screen such as an OLED display screen, but also to a non-self-emitting display screen such as a liquid crystal display screen or another passive light-emitting display screen. Moreover, the optical sensing array of the under-screen biometric identification apparatus 140 may be specifically a photo detector array (or referred to as a photodetector array) including a plurality of photo detectors or photodetectors distributed in an array, and the photo detectors or photodetectors may server as the optical sensing units as described above.

When a finger touches, presses, or approaches (collectively referred to as pressing for convenience of description) the biometric capturing area 130, light emitted by the display unit of the biometric capturing area 130 is reflected by the finger to form reflected light. The reflected light may carry fingerprint characteristic information of a user's finger. For example, after the light is reflected by a fingerprint on the surface of the user's finger, since the reflected light of a fingerprint ridge is different from that of a fingerprint valley, the reflected light carries fingerprint information of the user. The reflected light is returned to the display screen 120, received by a photodetector array of the under-screen biometric identification apparatus 140 underneath, and converted into a corresponding electrical signal, i.e., a biometric detection signal. The electronic device 100 can obtain biometric information of the user based on the biometric detection signal, and can further perform biometric matching verification, thereby completing identity verification of the current user so as to confirm whether the user has permission to perform a corresponding operation on the electronic device 100.

In other alternative embodiments, the under-screen biometric identification apparatus 140 may also be disposed in an entire area under the display screen 120 so as to extend the biometric capturing area 130 to the entire display area 102 of the display screen 120, thereby implementing full screen biometric identification.

It should be understood that in a specific implementation, the electronic device 100 may further include a protective cover 110, the protective cover 110 may be specifically a transparent cover such as a glass cover or a sapphire cover which is located on the display screen 120 and covers a front surface of the electronic device 100, and the surface of the protective cover 110 may also be provided with a protective layer. Therefore, in an embodiment of the present application, the so-called a finger pressing against the display screen 120 may actually refer to the finger pressing against the cover 110 on the display screen 120 or a surface of a protective layer covering the cover 110.

In one implementation, the under-screen biometric identification apparatus 140 may transmit light to a sensing array by using a periodic micro-hole array. This requires an optical fingerprint identification module to be attached under an OLED screen, while the process is complicated and costly. In another implementation, the under-screen biometric identification apparatus 140 may transmit light to a sensing array by using an integrated micro lens, which refers to designing the micro lens and the sensing array as a whole so as to further form an integrated module. Since the integrated module has a very high precision requirement in a mass production process, common processing technology is substantially insufficient to meet actual needs.

In order to solve the above technical problem, embodiments of the present application provide an improved technical solution. Specifically, provided is an under-screen biometric identification apparatus 140 in a defocusing state. More specifically, the under-screen biometric identification apparatus 140 may include a lens, a lens barrel and a sensing chip, where the lens is disposed under a display screen for receiving an optical signal from above the display screen and formed by reflection of a human finger, and the optical signal is used to detect biometric information of the finger; the lens is fixed in the lens barrel; and the sensing chip is disposed under the lens barrel for imaging based on an optical signal passing through the lens, where a distance between a photosurface of the sensing chip and an imaging surface of the lens is greater than or equal to a preset value.

It should be noted that, that the distance between the photosurface of the sensing chip and the imaging surface of the lens is greater than or equal to the preset value may also be understood as that the photosurface of the sensing chip is in a defocusing state.

It should be understood that in the embodiments of the present application, the lens may receive an optical signal formed by reflection of a structure of a display screen itself (for example, an internal circuit) in addition to an optical signal from above the display screen and formed by reflection of the human finger. If the photosurface of the sensing chip and the imaging surface of the lens are located in the same plane, the optical signal formed by reflection of the structure of the display screen itself may affect capturing of biometric information of the finger, and therefore when the distance between the photosurface of the sensing chip and the imaging surface of the lens is greater than or equal to the preset value, that is, the photosurface of the sensing chip is in a defocusing state relative to the lens, the influence of the optical signal formed by reflection of the structure of the display screen itself on the optical signal from above the display screen and formed by reflection of the human finger is greatly reduced when the optical signal formed by reflection of the structure of the display screen itself reaches the photosurface of the sensing chip, and when the above present value is 10 μm, the influence may be ignored.

It should be noted that, in certain scenarios, the lens in the embodiments of the present application needs to be configured as an element or a device for modulating light that is more accurate in an assembling process and smaller in volume than a front camera for photographing, so as to meet precise focusing requirements of an under-screen optical fingerprint.

Compared with the former implementation (using a periodic micro-hole array to transmit light onto a sensing array), the technical solution of the embodiments of the present application avoids attaching an optical fingerprint identification module to a lower surface of a display screen, and only requires to dispose an under-screen biometric identification apparatus 140 under the display screen. For example, the lens is disposed under the display screen, which effectively simplifies a mounting process of the under-screen biometric identification apparatus 140, improves a batch yield in the process of mounting the under-screen biometric identification apparatus 140, reduces a damage rate in a replacement process of the under-screen biometric identification apparatus 140, and further, reduces costs effectively.

Compared with the latter implementation (using an integrated micro lens to transmit light onto a sensing array), the technical solution of the embodiments of the present application achieves desired optical imaging by setting that a distance between a photosurface of the sensing chip and an imaging surface of the lens is greater than or equal to a preset value, thereby reducing requirements of processing technology, effectively solving a problem of high precision requirements in a mass production process of an integrated module, and also solving a problem of a batch yield of an integrated module in a production assembly process and a problem that an optimal focal length of the integrated module cannot be precisely aligned, and further, improving the efficiency of under-screen biometric identification.

The display screen applied in the technical solution of the embodiments of the present application may be an OLED screen, a soft screen or a hard screen, and the OLED screen is taken as an example for detailed description below. There are stacked layers under the OLED screen, such as a light shielding layer, a screen protection foam, optical glue, and a screen component flexible circuit board, holes are made in each stacked layer, and the OLED screen will leak light downward. When a finger is placed on an illuminated OLED screen, the finger will reflect light emitted by the OLED screen, and the reflected light will penetrate through the OLED screen until reaching a region under the OLED screen. It should be noted that, a fingerprint is a diffuse reflector whose reflected light exists in all directions. A microporous lens is placed under the OLED screen to collect light leaking from a fingerprint screen, and the light contains a fingerprint signal and an internal structure signal of the OLED screen. An infrared component in the leaking light is filtered out by an infrared cut optical filter, and a fingerprint image in which red light is filtered out is received by a sensing chip. By adjusting an imaging distance of an adjustment lens within a small defocus range, imaging of an internal structure of the OLED screen is blurred, while imaging of a fingerprint is not affected.

An under-screen biometric identification apparatus 200 according to an embodiment of the present application will be clearly described below with reference to FIGS. 3 to 11. It should be noted that, for convenience of description, in the embodiments of the present application, like reference numerals represent like components, and detailed description of the like components is omitted in different embodiments for the sake of brevity.

Figure 3:
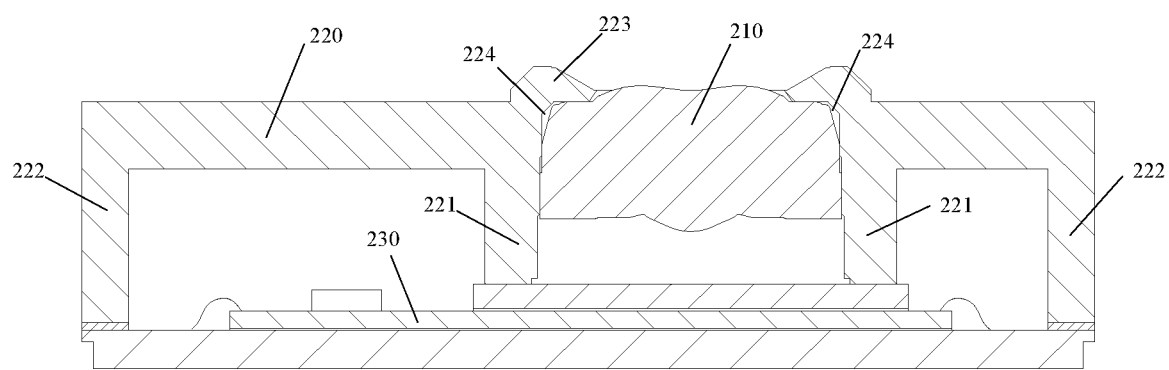
FIG. 3 is a partial schematic cross-sectional structural view of an under-screen biometric identification apparatus 200 provided by the present application.
Figure 4:
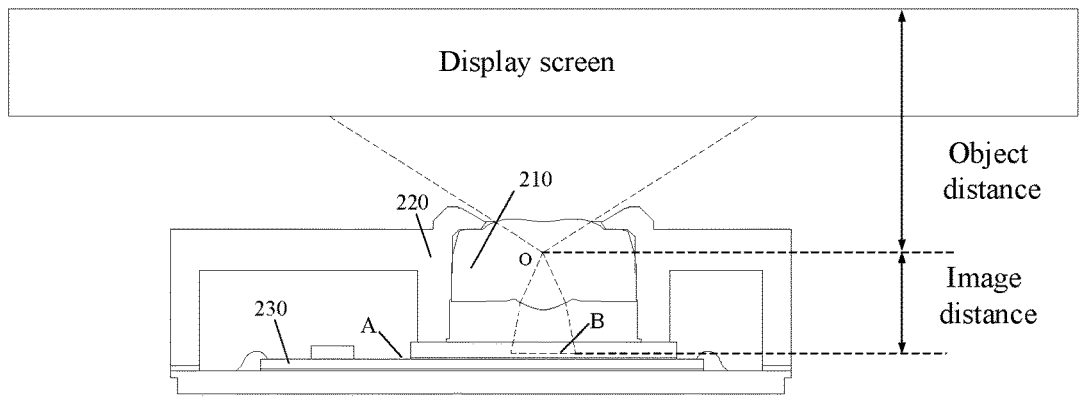
FIG. 4 is a schematic view showing that an imaging surface of a lens 210 is located above a photosurface of a sensing chip 230 in an embodiment of the present application.
Figure 5:
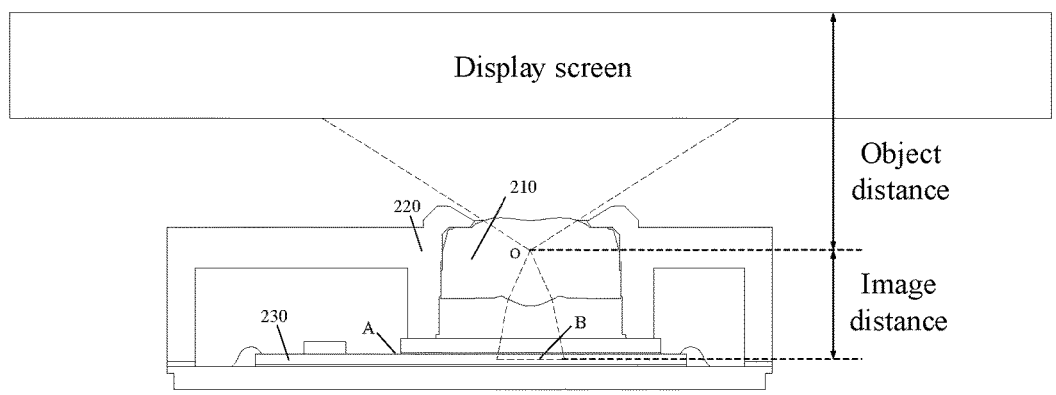
FIG. 5 is a schematic view showing that an imaging surface of a lens 210 is located below a photosurface of a sensing chip 230 in an embodiment of the present application.
Figure 6:
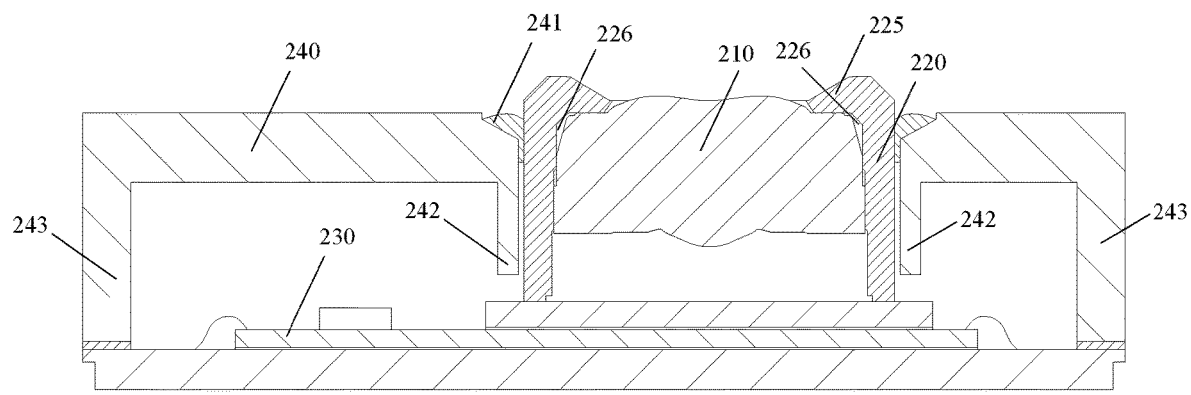
FIG. 6 is a partial schematic cross-sectional structural view of another under-screen biometric identification apparatus 200 provided by the present application.

FIGS. 3 to 6 show schematic views of an under-screen biometric identification apparatus 200, where FIG. 3 is a partial schematic cross-sectional structural view of an under-screen biometric identification apparatus 200. FIG. 4 is a schematic view showing that an imaging surface of a lens 210 is located above a photosurface of a sensing chip 230. FIG. 5 is a schematic view showing that an imaging surface of a lens 210 is located below a photosurface of a sensing chip 230. FIG. 6 is a partial schematic cross-sectional structural view of another under-screen biometric identification apparatus 200.

As shown in FIG. 3, the under-screen biometric identification apparatus 200 may include a lens 210, a lens barrel 220 and a sensing chip 230.

The lens 210 is disposed under a display screen for receiving an optical signal from above the display screen and formed by reflection of a human finger, and the optical signal is used to detect biometric information of the finger; the lens 210 is fixed in the lens barrel 220; and the sensing chip 230 is disposed under the lens barrel 220 for imaging based on an optical signal passing through the lens 210, and a distance between a photosurface of the sensing chip 230 and an imaging surface of the lens 210 is greater than or equal to a preset value. The display screen may be the display screen shown in FIG. 1 or FIG. 2. For related description, reference may be made to the foregoing description of the display screen 120, and no further details are provided herein for brevity.

It should be understood that the photosurface of the sensing chip 230 may be an upper surface of the sensing chip 230.

It should be noted that, not only does the optical signal from above the display screen and formed by the reflection of the human finger pass through the lens 210, but an optical signal of an internal structure of the display screen passes through a lens 210, and in this case, the optical signal of the internal structure of the display screen may affects capturing of biometric information of the finger.

It should be noted that, after light emitted by the display screen is reflected by a finger on the display screen, a portion of reflected light may be received by the lens 210.

In the embodiment of the present application, that the distance between the photosurface of the sensing chip 230 and the imaging surface of the lens 210 is greater than or equal to the preset value may be understood as that the photosurface of the sensing chip 230 is in a defocusing state. Two optical signals passing through the lens 210 are high frequency signals; however, in comparison, when the photosurface of the sensing chip 230 is in a defocusing state, the optical signal from above the display screen and formed by the reflection of the human finger can still be clearly imaged on the photosurface of the sensing chip 230 after passing through the lens 210, while the optical signal of the internal structure of the display screen cannot be imaged on the photosurface of the sensing chip 230 after passing through the lens 210 (or imaging of the optical signal of the internal structure of the display screen is blurred), and it is impossible to affect capturing of biometric information of the finger.

Optionally, in an embodiment of the present application, an imaging condition of the lens 210 may be the following optical imaging formula:

$$1/u+1/v=1/f.$$

In the formula, u denotes an object distance, v denotes an image distance, and f denotes a focal length. That is, the reciprocal of the object distance plus the reciprocal of the image distance is equal to the reciprocal of the focal length. In the embodiment of the present application, a distance between an upper surface of the display screen and an optical center of the lens 210 is an object distance, and a distance between the optical center of the lens 210 and the photosurface of the sensing chip 230 is an image distance, and a focal length of the lens 210 is a fixed value.

In other words, when the lens barrel 220 is fixed under the display screen, it requires distances among an upper surface of the display screen, an optical center of the lens 210 and the photosurface of the sensing chip 230 to satisfy the above optical imaging condition.

Optionally, in order to eliminate the influence of the optical signal of the internal structure of the display screen on imaging of a fingerprint signal, in the embodiment of the present application, the imaging surface of the lens 210 is located above or below the photosurface of the sensing chip 230. That is, in the above imaging condition of the lens 210, in a case that an object distance remains unchanged, defocusing of the photosurface of the sensing chip 230 can be implemented by changing a relative position of the photosurface of the sensing chip 230 and the imaging surface of the lens 210.

It should be noted that, in order to enable the sensing chip 230 to perform clear imaging, in design, the photosurface of the sensing chip 230 may be designed to overlap the imaging surface of the lens 210; and in module assembly, in order to overcome the influence of the optical signal of the internal structure of the display screen on capturing of biometric information of the finger, it is necessary to mount the photosurface of the sensing chip 230 above or below the imaging surface of the lens 210.

For example, as shown in FIG. 4, in module assembly, in order to make an imaging surface B of the lens 210 locate above a photosurface A of the sensing chip 230, a distance between the lens 210 and the sensing chip 230 (a distance between an optical center O of the lens 210 and the photosurface A of the sensing chip 230) may be appropriately increased. For example, a height of the lens barrel 220 (a height below the lens 210 in the lens barrel 220) may be increased, and/or an optical filter is added between the lens barrel 220 and the sensing chip 230, and then the purpose that the imaging surface B of the lens 210 is located above the photosurface A of the sensing chip 230 is achieved.

For another example, as shown in FIG. 5, in module assembly, in order to make an imaging surface B of the lens 210 located below a photosurface A of the sensing chip 230, a distance between the lens 210 and the sensing chip 230 (a distance between an optical center O of the lens 210 and the photosurface A of the sensing chip 230) may be appropriately decreased. For example, a height of the lens barrel 220 (a height below the lens 210 in the lens barrel 220) may be reduced, and/or a height of the lens barrel 220 is reduced in combination with an addition of an optical filter between the lens barrel 220 and the sensing chip 230, and then the purpose that the imaging surface B of the lens 210 is located below the photosurface A of the sensing chip 230 is achieved.

It should be understood that the optical center O of the lens 210 is a special point in the lens 210, where a propagation direction of light does not change as long as the light passes through the special point. The optical center of the lens 210 is also referred to as an optic center (Optical center) of the lens 210.

Preferably, the preset value is 10 µm. In this case, the influence of the optical signal of the internal structure of the display screen on capturing of biometric information of the finger can be ignored.

Optionally, in an embodiment of the present application, the lens 210 may include a lens consisting of at least one piece of aspherical injection molding optic to reduce imaging distortion of a fingerprint image.

It should be noted that a focal length of the lens consisting of at least one piece of aspherical injection molding optic may be smaller than a focal length of a front camera for photographing, or the lens 210 is a macro lens to meet requirements of under-screen fingerprint identification. For example, a focal length of the macro lens may range from 0.4 mm to 1.8 mm. It should be noted that the range is only an exemplary range of a gap satisfying an imaging condition, and the embodiment of the present application is not limited thereto. For example, the focal length of the macro lens may also be 2 mm.

In order to achieve the purpose of above module assembly, it is necessary to fix the lens barrel 220.

Optionally, in an embodiment of the present application, the lens barrel 220 and a fixing component thereof may be integrally designed, that is, after module assembly, the lens barrel 220 has a fixed assembly position, and in this case, not only can an imaging condition of the lens 210 be satisfied, but the influence of the optical signal of the internal structure of the display screen on capturing of biometric information of the finger can be overcome. Specifically, as shown in FIG. 3, a lower surface of the lens barrel 220 extends downward at a barrel opening of the lens barrel 220 to form a first fixing structure 221, the lower surface of the lens barrel 220 extends downward at an edge of the lens barrel 220 to form a second fixing structure 222, the lens barrel 220 forms a cavity between the first fixing structure 221 and the second fixing structure 222, and the lens 210 is fixed in the first fixing structure 221.

It should be understood that some passive elements such as a capacitor and a microcontroller unit (MCU) may be disposed in the cavity formed between the first fixing structure 221 and the second fixing structure 222.

Optionally, there may also be a fixing structure between the first fixing structure 221 and the second fixing structure 222, which is not specifically limited in the embodiment of the present application.

In order to ensure that the lens 210 is stably fixed in the lens barrel 220, optionally, in an embodiment of the present application, a structure for preventing the lens 210 from moving upward may be provided at a barrel opening on an upper surface of the first fixing structure 221. As shown in FIG. 3, an upper surface of the first fixing structure 221 extends inward at a barrel opening of the lens barrel 220 to form a first convex structure 223, and the first convex structure 223 is used for fixing the lens 210. Optionally, in another embodiment of the present application, in order to prevent the lens 210 from moving downward, an inner side surface of the lens barrel 220 and the lens 210 may be fixed by an adhesive attaching and fixing method.

It should be noted that, the upper surface of the first fixing structure 221 may be designed as a specific structure, such as a funnel structure or a bevel structure, so that an optical signal reflected by a human finger from a display screen passes through the first fixing structure 221 as much as possible, and then the amount of signals received by the lens 210 is increased. For example, as shown in FIG. 3, an upper surface of the first fixing structure 221 is provided with a bevel angle formed by chamfering processing at the barrel opening such that an inner diameter of the first fixing structure 221 at the upper surface is greater than an inner diameter of the first fixing structure 221 at the first convex structure 223.

Optionally, in an embodiment of the present application, an additional space for accommodating glue may be provided between an inner side surface of the lens barrel 220 and the lens 210 to increase reliability of attaching between the inner side surface of the lens barrel 220 and the lens 210. For example, as shown in FIG. 3, an inner side surface of the first fixing structure 221 is provided with a first step structure 224 formed under the first convex structure 223, and the lens 210 is fixed in the first fixing structure 221 through the first convex structure 223 and the first step structure 224. Specifically, the first step structure 224 could increase the accommodation space of the glue to the largest extent.

Optionally, in an embodiment of the present application, a foam may be disposed on the upper surface of the lens barrel 220 to achieve the purpose of dust seal.

Optionally, in another embodiment of the present application, the lens barrel 220 and a fixing component thereof may be separately designed, that is, after module assembly, the lens barrel 220 has a fixed assembly position, and in this case, not only can an imaging condition of the lens 210 be satisfied, but the influence of the optical signal of the internal structure of the display screen on capturing of biometric information of the finger can be overcome. Specifically, as shown in FIG. 6, the lens barrel 220 may be supported by a lens base 240, a dispensing structure is formed between the lens base 240 and the lens barrel 220, and the lens base 240 and the lens barrel 220 are fixed by means of dispensing glue in the dispensing structure. For example, as shown in FIG. 6, the dispensing structure may include a second step structure 241 formed by an upper surface of the lens barrel 240 extending downward in a peripheral area close to the lens barrel 220, the second step structure 241 may provide an accommodation space for glue. Therefore, the lens barrel 220 and the lens base 240 can be fixedly connected by means of dispensing glue in the accommodation space provided by the second step structure 241.

It should be understood that the second step structure 241 may include one or more steps, which is not specifically limited in the embodiment of the present application.

It should also be understood that the second step structure 241 may be continuous or discrete around the lens barrel 220. This is not limited by the embodiment of the present application.

Optionally, in an embodiment of the present application, reliability of connection between the lens barrel 220 and the lens base 240 may be enhanced. For example, as shown in FIG. 6, a lower surface of the lens base 240 extends downward in a peripheral area close to the lens barrel 220 to form a third fixing structure 242 surrounding and fixing the lens barrel 220. Moreover, in order to prevent the third fixing structure 242 from possibly pressing for example a sensing chip 230 and an optical filter 250 under the lens barrel 220, or to prevent the third fixing structure 242 from possibly affecting assembly of for example a sensing chip 230 and an optical filter 250 under the lens barrel 220, a bottom of the third fixing structure 242 is in a suspending state.

It should be understood that the third fixing structure 242 may surround and fix the lens barrel 220 continuously, or may surround and fix the lens barrel 220 discretely, which is not specifically limited in the embodiment of the present application.

Optionally, in an embodiment of the present application, in order to fix the lens base 240, a lower surface of the lens base 240 extends downward at an edge of the lens base 240 away from the lens barrel 220 to form a fourth fixing structure 243, where a downward extension height of the fourth fixing structure 243 is greater than a downward extension height of the third fixing structure 242. Specifically, the fourth fixing structure 243 may be continuous or discrete in a certain direction, which is not limited in the embodiment of the present application.

In order to ensure that the lens 210 is stably fixed in the lens barrel 220, optionally, in an embodiment of the present application, a structure for preventing the lens 210 from moving upward may be provided at a barrel opening on an upper surface of the lens barrel 220. For example, as shown in FIG. 6, an upper surface of the lens barrel 220 extends inward at a barrel opening to form a second convex structure 225, and the second convex structure 225 is used for fixing the lens 210. Optionally, in another embodiment of the present application, in order to prevent the lens 210 from moving downward, an inner side surface of the lens barrel 220 and the lens 210 may be fixed by an adhesive attaching and fixing method.

Optionally, in an embodiment of the present application, an upper surface of the second convex structure 225 may be designed as a specific structure, such as a funnel structure or a bevel structure, so that an optical signal reflected by a human finger from a display screen passes through the second convex structure 225 as much as possible, and then the amount of signals received by the lens 210 is increased. For example, as shown in FIG. 6, an upper surface of the lens barrel 220 is provided with a bevel angle formed by chamfering processing at the barrel opening such that an inner diameter of the lens barrel 220 at the upper surface is greater than an inner diameter of the lens barrel 220 at the second convex structure 225.

Optionally, in an embodiment of the present application, an additional space for accommodating glue may be provided between an inner side surface of the lens barrel 220 and the lens 210 to increase reliability of attaching between the inner side surface of the lens barrel 220 and the lens 210. For example, as shown in FIG. 6, an inner side surface of the lens barrel 220 is provided with a third step structure 226 formed under the second convex structure 225, and the lens 210 is fixed in the lens barrel 220 through the second convex structure 225 and the third step structure 226. Specifically, the third step structure 226 could increase the accommodation space of the glue to the largest extent.

Optionally, in an embodiment of the present application, a foam may be disposed on the upper surface of the lens base 240 to achieve the purpose of dust seal.

It should be understood that the lens 210, the lens barrel 220, and the lens base 240 may be designed with other structures in a specific implementation. For example, the lens 210 may also be designed with a size mark (a) of the lens 210. The lens barrel 220 may also be designed with a size mark (A1) of the lens barrel 220. The lens barrel 220 may also be designed with an assembly size, and the assembly of the lens barrel 220 may be performed based on the assembly size in a process of module assembly. For example, a different manufacturer can use a different aperture and bore depth (that is, a barrel diameter and barrel depth of the lens barrel 220). The lens barrel 220 shown in FIG. 3 may also be designed with a hole for fixing the lens barrel 220, such as a threaded fixing hole. The lens base 240 shown in FIG. 6 may also be designed with a hole for fixing the lens base 240, such as a threaded fixing hole.

Figure 7:
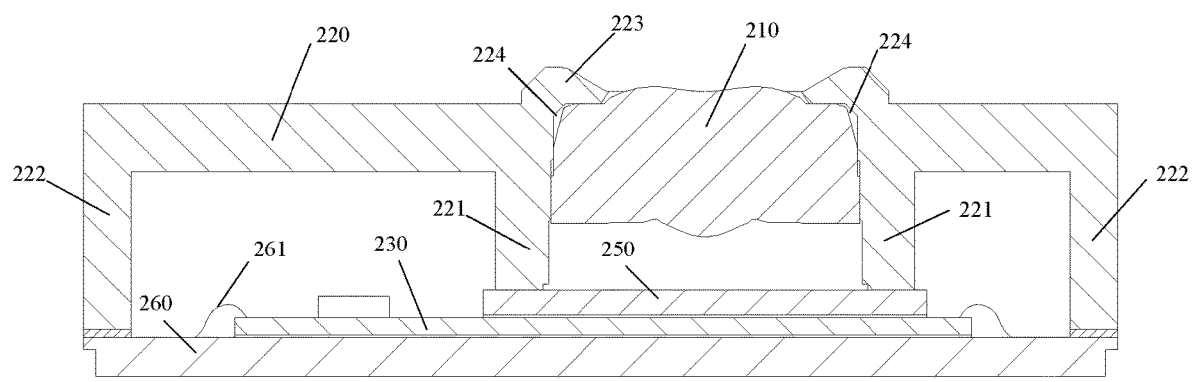
FIG. 7 is a partial schematic cross-sectional structural view of an optical filter and a printed circuit board in an under-screen biometric identification apparatus according to an embodiment of the present application.
Figure 8:
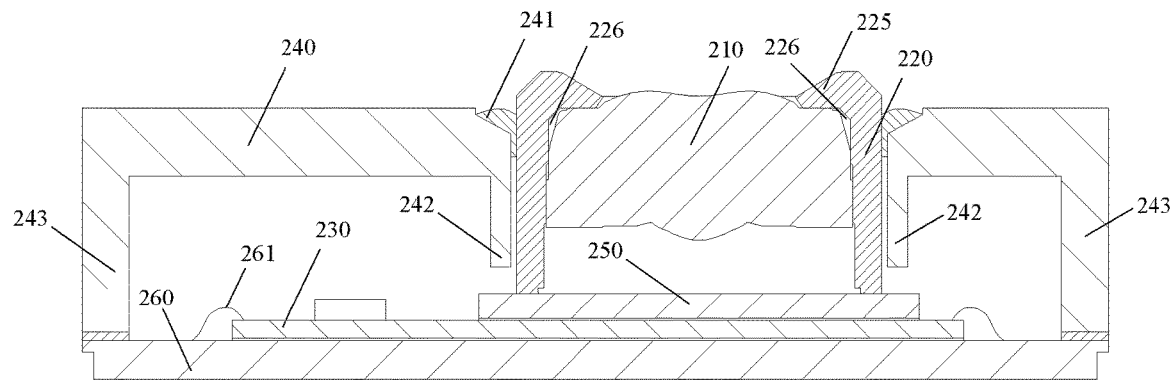
FIG. 8 is a partial schematic cross-sectional structural view of an optical filter and a printed circuit board in another under-screen biometric identification apparatus according to an embodiment of the present application.

FIGS. 7 and 8 are schematic views of an under-screen biometric identification apparatus 200 according to embodiments of the present application. FIG. 7 is a partial schematic cross-sectional structural view showing that an optical filter 250 and a flexible printed circuit board 260 are further integrated in the under-screen biometric identification apparatus 200 shown in FIG. 3. FIG. 8 is a partial schematic cross-sectional structural view showing that an optical filter 250 and a flexible printed circuit board 260 are further integrated in the under-screen biometric identification apparatus 200 shown in FIG. 6.

In the embodiments of the present application, before reaching the sensing chip 230, an optical signal passing through the lens 210 may also be filtered by an optical filter to filter out unnecessary light.

Optionally, in an embodiment of the present application, as shown in FIGS. 7 and 8, the under-screen biometric identification apparatus 200 may further include: an optical filter 250. The optical filter 250 is located between the lens barrel 220 and the sensing chip 230.

It should be noted that, the optical filter 250 is fixed on an upper surface of the sensing chip 230. For example, the optical filter 250 may be fixed on the sensing chip 230 by an optical adhesive.

Optically, as shown in FIG. 7, the optical filter 250 at least covers a lower surface of the first fixing structure 221 by means of direct contact with a bottom of the lens barrel 220.

Optically, as shown in FIG. 8, the optical filter 250 at least covers a lower surface of the lens barrel 220 by means of direct contact with a bottom of the lens barrel 220.

It should be understood that the optical filter 250 is used to reduce undesired background light in fingerprint sensing to improve optical sensing of received light by the sensing chip 230. The optical filter 250 may be specifically used to filter out the environment light wavelengths, such as near IR and part of red light etc. Another example is blue light or part of blue light. For example, human fingers absorb most of the energy of the wavelengths under 580 nm, and if one or more optical filters or optical filtering coatings can be designed to filter out light in wavelengths from 580 nm to infrared, undesired contributions to the optical detection in fingerprint sensing from the environment light may be greatly reduced.

Optically, in an embodiment of the present application, the optical filter 250 may be an infrared cut optical filter and/or a blue light cut optical filter.

Optionally, in an embodiment of the present application, the optical filter 250 may include one or more optical filters; the one or more optical filters can be configured, for example, as bandpass filters to allow transmission of light emitted by OLED pixels while blocking other light components such as IR light in the sunlight. This optical filtering could be effective in reducing background light caused by the sunlight when using the under-screen biometric identification apparatus 200 outdoors. The one or more optical filters can be implemented as, for example, optical filter coatings formed on one or more continuous interfaces or one or more discrete interfaces. It should be understood that the optical filter 250 can be fabricated on a surface of any optical component or along an optical path to the sensing chip 230 from reflected light formed by reflection of a finger.

The embodiments of the present application merely take an example that the optical filter 250 is located on an upper surface of the sensing chip 230, but the present application is not limited thereto. For example, the optical filter 250 may be attached to a bottom surface of a display, an upper/lower surface of a lens, an inside of a lens barrel or an interior of the sensing chip 230, or the like.

Optionally, in an embodiment of the present application, the under-screen biometric identification apparatus 200 may further include a circuit board for transmitting a signal. As shown in FIGS. 7 and 8, the circuit board may be a flexible printed circuit (FPC) board 260.

Optionally, the sensing chip 230 may be fixed on an upper surface of the flexible printed circuit board 260 by die attached epoxy, and the sensing chip 230 is electrically connected to the flexible printed circuit board 260 by a bonding wire 261. The sensing chip 230 may also be welded to an upper surface of the flexible printed circuit board 260 through a pad. Specifically, the sensing chip 230 can achieve electrical interconnection and signal transmission with other peripheral circuits or other elements of the electronic device 100 as shown in FIG. 1 or FIG. 2 through the flexible printed circuit board 260. For example, the sensing chip 230 may receive a control signal of a processing unit of the electronic device 100 through the flexible printed circuit board 260, and may also output a biometric detection signal (e.g., a fingerprint image) to the processing unit, a control unit or the like of the electronic device 100 through the flexible printed circuit board 260.

Optionally, as shown in FIG. 7, a lower surface of the second fixing structure 222 is fixedly connected to an upper surface of the flexible printed circuit board 260 in an edge area of the sensing chip 230.

Optionally, as shown in FIG. 8, a lower surface of the fourth fixing structure 243 is fixedly connected to an upper surface of the flexible printed circuit board 260 in an edge area of the sensing chip 230.

Specifically, the lower surface of the second fixing structure 222 of the lens barrel 220 or the fourth fixing structure 243 of the lens base 240 may be sealedly bonded by means of dispensing fixing glue on the flexible printed circuit board 260. For example, the fixing glue may be glue that belongs to epoxy systems or acrylic systems, and the fixing glue has at least one of the following characteristics: opaque to visible light, a thickness of 0.02 mm~0.10 mm, viscosity greater than 20000 mPas and a curing shrinkage percentage less than 3%. A curing manner of the fixing glue may be low temperature curing within a temperature of 85° C., may also be ultraviolet rays (UV) curing, or may be UV curing in combination with low temperature curing within a temperature of 85° C.

It should be noted that, the principle of UV curing is that photoinitiator (or photosensitizer) in UV curable material generates living radicals or cations after absorbing ultraviolet light under irradiation of ultraviolet rays, and chemical reactions of monomer polymerization and crosslinking are initiated such that an adhesive is changed from a liquid into a solid in a few seconds.

As shown in FIG. 7, since the lens barrel 220 is fixed on the upper surface of the flexible printed circuit board 260, a closed space may be formed between the lens barrel 220 and the flexible printed circuit board 260. As shown in FIG. 8, since the lens base 240 is fixed on the upper surface of the flexible printed circuit board 260, a closed space may be formed between the lens base 240 and the flexible printed circuit board 260. Influence on stability of the under-screen biometric identification apparatus 200 due to too large or too small pressure intensity in the closed space should be avoided.

Optionally, in an embodiment of the present application, the lens barrel 220 shown in FIG. 7 may be provided with a vent hole for adjusting an atmospheric pressure intensity of an internal space formed by the lens barrel 220 and the flexible printed circuit board 260. The lens base 240 shown in FIG. 8 may be provided with a vent hole for adjusting an atmospheric pressure intensity of an internal space formed by the lens base 240 and the flexible printed circuit board 260.

Optionally, in an embodiment of the present application, the under-screen biometric identification apparatus 200 may further include a steel plate fixed on a lower surface of the flexible printed circuit board 260.

Optionally, in an embodiment of the present application, the under-screen biometric identification apparatus further includes a fixing support 270.

Figure 9:
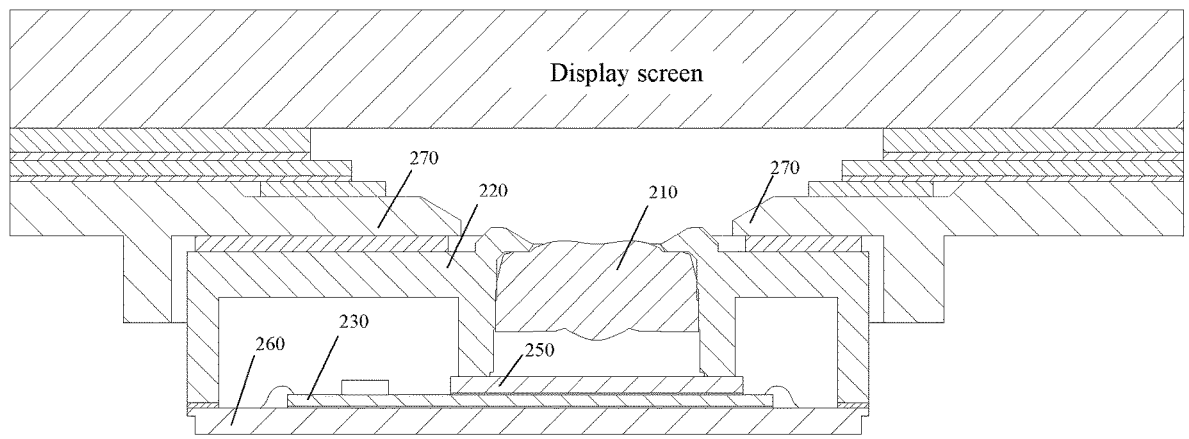
FIG. 9 is a schematic structural view of a fixing support in an under-screen biometric identification apparatus according to an embodiment of the present application.
Figure 10:
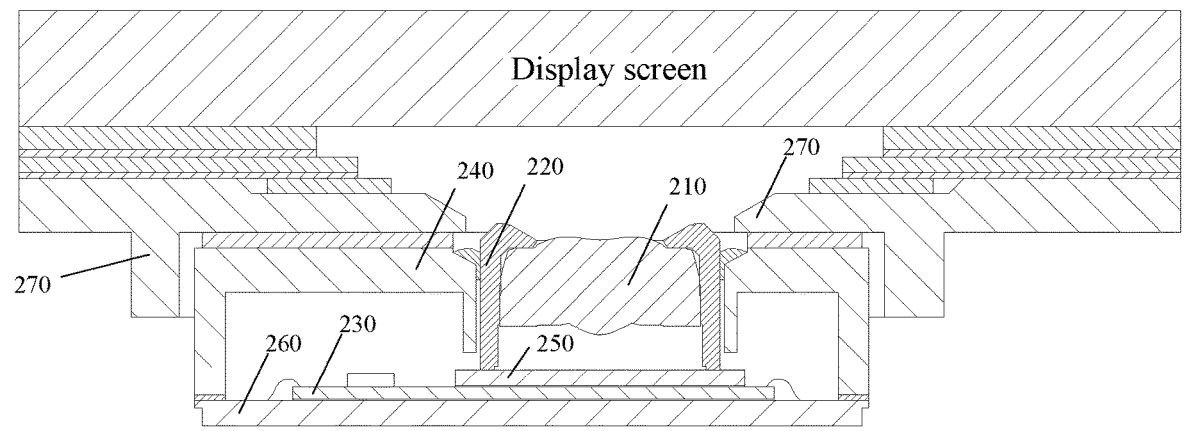
FIG. 10 is a schematic structural view of a fixing support in another under-screen biometric identification apparatus according to an embodiment of the present application.

Specifically, as shown in FIG. 9, the lens barrel 220 is fixed under the display screen by the fixing support 270 such that a distance between an upper surface of the display screen and an optical center of the lens 210 satisfies an imaging condition. As shown in FIG. 10, the lens base 240 is fixed under the display screen by the fixing support 270 such that a distance between an upper surface of the display screen and an optical center of the lens 210 satisfies an imaging condition.

Optionally, the fixing support 270 and the lens barrel 220, or the fixing support 270 and the lens base 240, are fixed by at least one of the following mounting methods: a screw mounting and fixing method, and an adhesive attaching and fixing method, a welding and fixing method and a coupling and fixing method.

In the embodiment of the present application, the under-screen biometric identification apparatus 200 may be mounted under the display screen by being fixedly connected to an easily disassembled device inside a terminal device.

In other words, the above-described easily disassembled device may serve as a fixing support 270 between the under-screen biometric identification apparatus 200 and the display screen. The under-screen biometric identification apparatus 200 can be fixedly disposed under the display screen in a non-contact manner by other auxiliary elements. For example, the under-screen biometric identification apparatus 200 can be fixed to the fixing support 270, and fixedly disposed under the display screen through the fixing support 270.

Optionally, in an embodiment of the present application, when the under-screen biometric identification apparatus 200 is applied to a terminal device (such as a smart phone), the fixing support 270 is a middle frame of the terminal device, and the middle frame is used for supporting the display screen. The under-screen biometric identification apparatus 200 may be fixed under the display screen through the middle frame or other components of the terminal device.

Figure 11:
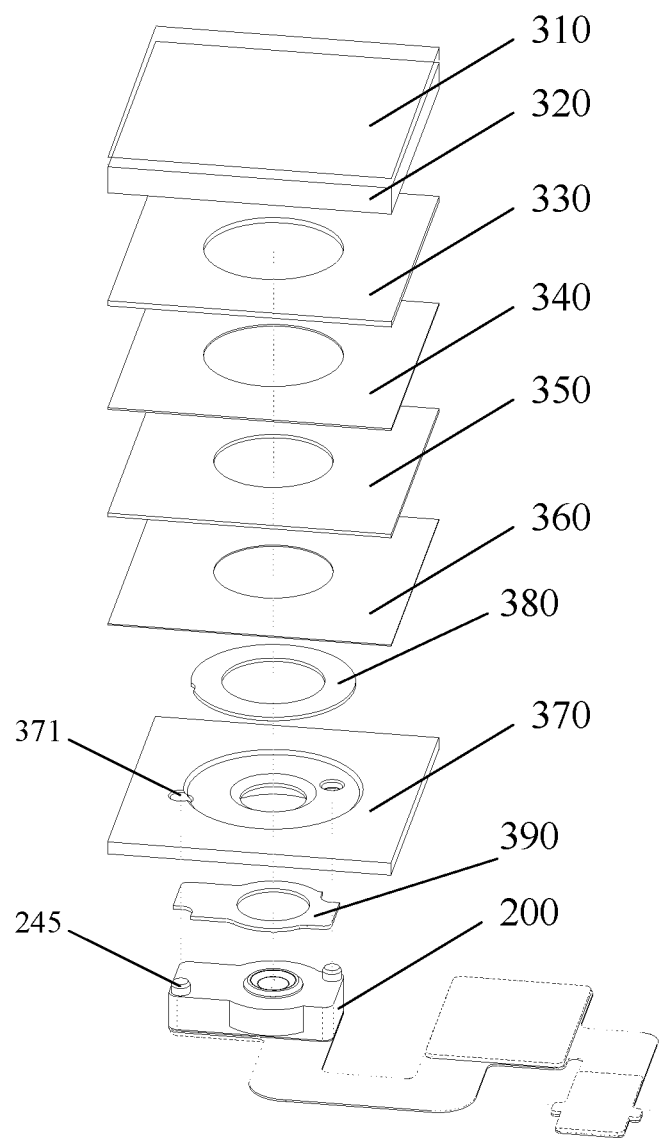
FIG. 11 is a schematic view showing that the under-screen biometric identification apparatus 200 is fixed under a display screen 230 through a middle frame 370 according to an embodiment of the present application.

FIG. 11 is a schematic view showing that the under-screen biometric identification apparatus 200 is fixed under a display screen 320 through a middle frame 370. The under-screen biometric identification apparatus 200 may be shown in FIG. 3, or may be shown in FIG. 6. The under-screen biometric identification apparatus 200 shown in FIG. 6 will be described below as an example of the under-screen biometric identification apparatus 200.

Specifically, the display screen 320 may be the OLED display screen 120 as shown in FIG. 1 or FIG. 2, and the under-screen biometric identification apparatus 200 may be the under-screen biometric identification apparatus 140 as shown in FIG. 1 or FIG. 2, which may specifically include the lens 210, the lens barrel 220, the sensing chip 230, the lens base 240, the optical filter 250, the flexible printed circuit board 260, and the like. The under-screen biometric identification apparatus 200 may be used for capturing a fingerprint or other biometric characteristics, and a biometric capturing area is at least partially located in a display area of the display screen 320. As for specific structures, functions, and biometric detection and identification processes of the display screen 320 and the under-screen biometric identification apparatus 200, reference can be made to the previous description of the OLED display screen 120 and the under-screen biometric identification apparatus 140, which will not be repeated redundantly herein.

The middle frame 370 is a frame of an electronic device that is disposed between the display screen 320 and a back cover and used for carrying various components therein, and the various components therein include, but are not limited to, a battery, a main board, a camera, a flex cable, various sensors, a microphone, an earphone, or the like.

The middle frame 370 may be made of a metal or alloy material, or even made of a plastic material. In this case, the middle frame 370 may even be integrally formed with a bezel of a mobile terminal, which means that the inner middle frame and the bezel serve as a whole. For example, the bezel may be just a metal welt, or a metal-like coating may be applied to the middle frame. Further, the middle frame 370 may further be a composite middle frame, for example, including an inner middle frame and an outer middle frame, where the inner middle frame is used for carrying parts of a mobile phone (such as the lens base 240), the outer middle frame is located outside the inner middle frame, an outer edge of the outer middle frame is equipped with a button of the mobile phone, and the inner middle frame is integrated with the outer middle frame.

Optionally, in an embodiment of the present application, there is a gap between the under-screen biometric identification apparatus 200 and the display screen 320.

It should be understood that there is a gap between the under-screen biometric identification apparatus 200 and the display screen 320 in order to enable the distance between the upper surface of the display screen and the optical center of the lens 210 to satisfy the imaging condition. The size and specific meaning of the gap are not limited in the embodiment of the present application.

For example, the gap may be determined by a manufacturer debugging in a process of mounting the biometric identification apparatus 200, or may be specified by various manufacturers.

For another example, the gap may be the distance between the upper surface of the lens barrel 220 and the lower surface of the display screen 320, or may be the distance between the upper surface of the support 270 and the lower surface of the display screen 320.

Optionally, in an embodiment of the present application, a width of the gap between the under-screen biometric identification apparatus 200 and the display screen 320 may be greater than or equal to a first distance, and the first distance is a minimum distance that the lens barrel 220 does not touch the display screen 320 when a terminal device is in a shaking state such as a drop or a collision.

For example, the width of the gap may range from 0.3 mm to 1 mm. It should be noted that the range is only an exemplary range of the gap, and the embodiment of the present application is not limited thereto.

It should be understood that although the middle frame 370 being a fixing support is taken as an example in the above-mentioned embodiment, in other embodiments, the under-screen biometric identification apparatus 200 may be mounted under the display screen 320 by being fixedly connected to any easily disassembled device in a terminal device, while ensuring that there is a gap between the under-screen biometric identification apparatus 200 and the display screen 320, as long as the under-screen biometric identification apparatus 200 can be fixedly disposed under the display screen 320 in a non-contact manner. In other embodiments, the under-screen biometric identification apparatus 200 may also be fixed on an easily disassembled device such as a back cover, a main board, a battery, or the like of the mobile terminal, and is further fixedly disposed under the display screen 320.

Since the under-screen biometric identification apparatus 200 is disposed under the display screen 320 in a non-contact manner and is not in contact with the lower surface of the display screen 320, the under-screen biometric identification apparatus 200 is completely decoupled to the display screen 320, thereby avoiding damage to the display screen 320 when the under-screen biometric identification apparatus 200 is disassembled.

In addition, since the under-screen biometric identification apparatus 200 is not in contact with the lower surface of the display screen 320, a fixed gap is maintained there between, and the gap may be an air gap that is not filled with any auxiliary material, which could ensure that the under-screen biometric identification apparatus 200 does not touch the lower surface of the display 320 when the display screen 320 is pressed or the terminal device is dropped or collided, and stability and performance of biometric identification of the under-screen biometric identification apparatus 200 are not affected.

In summary, in the embodiment of the present application, the under-screen biometric identification apparatus 200 is designed to be separated from the lower surface of the display screen 320, which could reduce a difficulty of disassembling the under-screen biometric identification apparatus 200, and improve maintainability of a terminal device. Further, complexity of mounting the under-screen biometric identification apparatus 200 under the display screen 320 in a manufacturing process of the under-screen biometric identification apparatus could be reduced, a manufacturing success rate of the under-screen biometric identification apparatus could be improved, and further, production cost is reduced. Moreover, biometric identification stability and performance of the under-screen biometric identification apparatus 200 are not affected either.

It should be noted that, in the embodiment of the present application, the positional relationship between the display screen 320 and the middle frame 370 is relatively fixed.

Optionally, in an embodiment of the present application, as shown in FIG. 11, a screen component flexible circuit board 360 is provided between the display screen 320 and the middle frame 370, and the display screen 320 can achieve electrical interconnection and signal transmission with other peripheral circuits or other elements of the electronic device 100 as shown in FIG. 1 or FIG. 2 through the screen component flexible circuit board 360.

Optionally, as shown in FIG. 11, a foam 340 is provided between the display screen 320 and the screen component flexible circuit board 360, the foam 340 is bonded to the display screen 320 by optical glue 330, and the foam 340 is bonded to the screen component flexible circuit board 360 by optical glue 350. In other words, the screen component flexible circuit board 360 is fixed under the display screen 320 through the optical glue 330, the foam 340, and the optical glue 350.

It should be noted that, the foam 340 has the effect of dust seal in addition to the use of bonding the screen component flexible circuit board 360 and the display screen 320 in cooperation with the optical glue 330 and the optical glue 350.

Optionally, as shown in FIG. 11, the middle frame 370 and the screen assembly flexible circuit board 360 are sealedly connected by a foam 380, and the foam 380 is a compressible foam that is provided with an adhesive on at least one side. Optionally, a compression percentage of the foam 380 is greater than 50%. When the foam 380 is provided with adhesives on two sides, viscosity of an adhesive for bonding and attaching the foam 380 and the screen component flexible circuit board 360 is weaker than viscosity of an adhesive for bonding and attaching the foam 380 and the middle frame 370.

It should be noted that, the foam 380 has the effect of dust seal in addition to the use of bonding the screen component flexible circuit board 360 and the middle frame 370. When fixed connection is performed by a double-sided adhesive tape fixing method or an optical glue fixing method, stability of the fixed connection could be enhanced.

Optionally, as shown in FIG. 11, a positioning post 245 is disposed on the lens base 240 of the under-screen biometric identification apparatus 200, the middle frame 370 is provided with a positioning hole 371, the positioning post 245 and the positioning hole 371 may form accurate positioning, while the positioning post 245 and the positioning hole 371 are bonded by a double-sided adhesive tape 390 that is a double-sided adhesive tape with a certain thickness and dimensional retention force.

Optionally, as shown in FIG. 11, each stacked layer between the display screen 320 and the under-screen biometric identification apparatus 200 is provided with a hole formed in a mounting area of the under-screen biometric identification apparatus 200, the under-screen biometric identification apparatus 200 is disposed under the hole, and an optical sensing array thereof is disposed just opposite the lower surface of the display screen 320 through the hole. Therefore, when the under-screen biometric identification apparatus 200 is disposed at the lower surface of the middle frame 370, it could ensure that the under-screen biometric identification apparatus 200 can receive the above reflected light through the hole.

It should be understood that the size of the hole is not specifically limited in the embodiment of the present application. For example, the size of the hole of the middle frame 370 may be smaller than or equal to the size of the under-screen biometric identification apparatus 200. For another example, the size of the hole of the middle frame 370 may also be greater than or equal to the size of the lens barrel 220.

Optionally, in an embodiment of the present application, the size of the hole of the middle frame 370 is greater than the size of the lens barrel 220, and the size of the hole 371 of the middle frame 370 is smaller than the size of the under-screen biometric identification apparatus 200. In this case, the lens barrel 220 can be at least partially accommodated in the hole of the middle frame 370, and a buffer space can be formed between the lens barrel 220 and the middle frame 370, which can ensure that the lens barrel 220 does not touch the middle frame 370 when the middle frame 370 is pressed or a terminal device is dropped or collided, and stability and performance of biometric identification of the under-screen biometric identification apparatus 200 are not affected either.

It should be noted that, a distance from the display screen 320 to the middle frame 370 constitutes part of an image distance of the under-screen biometric identification apparatus 200. Within a distance range that constitutes the part of the image distance, a material and a hole of each stacked layer structure under the display screen 320 shall not block an effective light path, and good sealing is formed between the stacked layers to avoid the lens from contamination (which mainly refers to light signal contamination), thereby affecting the quality of imaging.

Optionally, in an embodiment of the present application, as shown in FIG. 11, when the under-screen biometric identification apparatus 200 is applied to a terminal device, an upper surface of the display screen 320 is further provided with a cover 310. The cover 310 may be a transparent protective cover, such as a glass cover or a sapphire cover, which may cover the display screen 320, and a lower surface of the cover 310 may be attached to the upper surface of the display screen 320 (i.e., a display plane). The display screen 320 and the cover 310 may be connected by an adhesive layer or may be connected in other connection methods, which is not limited in this embodiment of the present application.

In the embodiment of the present application, if the under-screen biometric identification apparatus 200 optically performs biometric identification, for example, optical fingerprint identification, the under-screen biometric identification apparatus 200 needs to detect reflected light formed by reflection of a finger from an optical signal emitted by the display screen 320.

In an actual product, if a thickness of the middle frame 370 is thicker, optionally, in an embodiment of the present application, thinning processing can be performed for the mounting area of the under-screen biometric identification apparatus 200 on the middle frame 370.

Through the foregoing analysis, it can be found that, in the embodiments of the present application, the under-screen biometric identification apparatus 200 is designed to be separated from the display screen 320, for example, the under-screen biometric identification apparatus 200 can be fixed on the middle frame 370 or the back cover structure, so as to solve problems such as disassembling difficulty, easy damage to the display screen 320 and high attaching process difficulty that result from directly attaching the under-screen biometric identification apparatus 200 to the display screen 320 with respect to the current under-screen biometric identification apparatus.

In addition, in the embodiments of the present application, a gap is formed between the under-screen biometric identification apparatus 200 and the lower surface of the display screen 320, and the gap could ensure that the under-screen biometric identification apparatus 200 does not touch the lower surface of the display 320 when the display screen 320 is pressed or when the terminal device is dropped or collided, thereby avoiding damage to the display screen 320.

In the embodiments of the present application, the under-screen biometric identification apparatus 200 may also be referred to as a biometric identification module. A photodetector array may also be referred to as a photosensor array that can transmit light from lens 220. For example, the photosensor array can employ an array of photodiodes through which an optical signal is converted into an electrical signal so that imaging can be performed based on the electrical signal.

Figure 12:
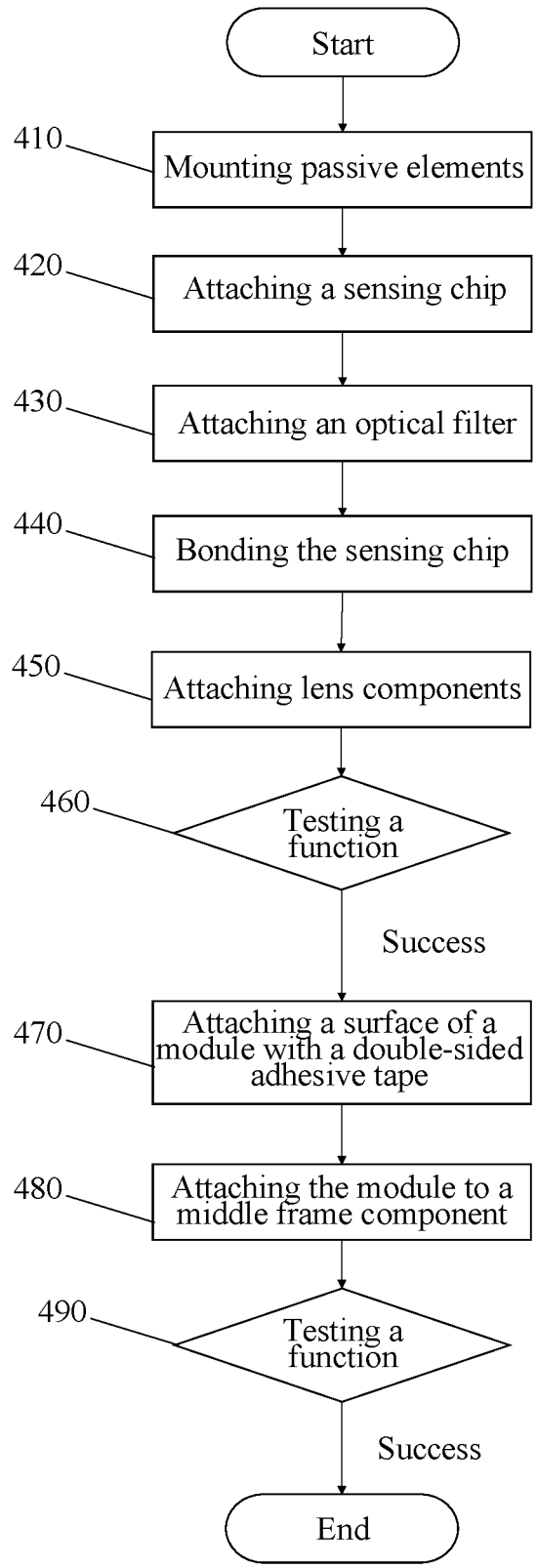
FIG. 12 is a flowchart of an assembly process of an under-screen biometric identification apparatus 200 according to an embodiment of the present application.

FIG. 12 is a flowchart of an assembly process of an under-screen biometric identification apparatus 200. Specifically, an assembly process 400 includes:

410, passive components are mounted.

Passive elements such as a capacitor and an MCU are fixed on a sensing chip 230 while the passive components are electrically connected to the sensing chip 230.

420, a sensing chip is attached.

The sensing chip 230 is fixed on a flexible printed circuit board 260 by die attached epoxy.

430, an optical filter is attached.

An optical filter 250 is fixed on the sensing chip 230 by optical glue.

440, a sensing chip is bonded.

The sensing chip 230 is electrically connected to the flexible printed circuit board 260 by a bonding wire 261.

450, lens components are attached.

In the solution of the under-screen biometric identification apparatus 200 described in FIG. 3, the lens 210 is mounted in the lens barrel 220, and the second fixing structure 222 of the lens barrel 220 is fixed on the flexible printed circuit board 260 by fixing glue.

In the solution of the under-screen biometric identification apparatus 200 described in FIG. 6, the lens 210 is mounted in the lens barrel 220, the lens base 240 and the lens barrel 220 are fixedly connected, and the fourth fixing structure 243 of the lens base 240 is fixed on the flexible printed circuit board 260 by fixing glue.

Specifically, the fixing glue may be glue that belongs to epoxy systems or acrylic systems, and the fixing glue has at least one of the following characteristics: opaque to visible light, a thickness of 0.02 mm~0.10 mm, viscosity greater than 20000 mPas and a curing shrinkage percentage less than 3%. A curing manner of the fixing glue may be low temperature curing within a temperature of 85° C., may also be UV curing in combination with low temperature curing within a temperature of 85° C.

460, a function is tested.

In this case, a test of the under-screen biometric identification apparatus 200 such as a fingerprint detection test is mainly performed.

470, a surface of a module is attached with a double-sided adhesive tape.

The above-mentioned module is the under-screen biometric identification apparatus 200. When the test is passed in step 450, an upper surface of the lens barrel (such as the solution shown in FIG. 3) or the lens base (the solution shown in FIG. 6) of the under-screen biometric identification apparatus 200 is attached with a double-sided adhesive tape.

480, the module is attached to a middle frame component.

The lens barrel (such as the solution shown in FIG. 3) or the lens base (the solution shown in FIG. 6) of the under-screen biometric identification apparatus 200 is fixed to a middle frame 370 by a double-sided adhesive tape.

490, a function is tested.

In this case, a comprehensive test, that is, a complete machine test, is performed, and when the test is passed, the assembly process is finished.

In an embodiment of the present application, a biometric identification component is further provided, which may include an under-screen biometric identification apparatus and a module support; when applied to the under-screen biometric identification apparatus or terminal device as described above, the biometric identification component may be directly mounted to a middle frame or the fixing frame of the terminal device. However, when the biometric identification apparatus or the under-screen biometric identification apparatus of the terminal device is damaged, the damaged biometric identification component can be replaced, and therefore, maintenance of replacing the under-screen biometric identification apparatus and complexity of replacing the device could be further reduced, thereby avoiding damage to the display screen.

In an embodiment of the present application, an electronic device is further provided, which may include a display screen and the under-screen biometric identification apparatus in the foregoing embodiments of the present application, where the under-screen biometric identification apparatus is disposed under a display screen such that a distance between an upper surface of the display screen and an optical center of a lens in the under-screen biometric identification apparatus satisfies an imaging condition.

The electronic device can be any electronic device having a display screen, which implements under-screen biometric identification using a technical solution of an embodiment of the present application. The display screen may be an organic light-emitting diode display screen including a plurality of organic light-emitting diode light sources, where the under-screen biometric identification apparatus adopts at least a portion of the organic light-emitting diode light sources as an excitation source for biometric identification.

It should be understood that specific examples in embodiments of the present application are just for helping those skilled in the art better understand the embodiments of the present application, rather than for limiting the scope of the present application.

It should be understood that terms used in embodiments of the present application and the claims appended hereto are merely for the purpose of describing particular embodiments, and are not intended to limit the embodiments of the present application. For example, the use of a singular form of "a", "the" and "said" in the embodiments of the present application and the claims appended hereto are also intended to include a plural form, unless otherwise clearly indicated herein by context.

Those of ordinary skill in the art may be aware that, units of the examples described in the embodiments disclosed in this paper may be implemented by electronic hardware, computer software, or a combination of the two. To clearly illustrate interchangeability between the hardware and the software, the foregoing illustration has generally described composition and steps of the examples according to functions. Whether these functions are performed by hardware or software depends on particular applications and designed constraint conditions of the technical solutions. Persons skilled in the art may use different methods to implement the described functions for every particular application, but it should not be considered that such implementation goes beyond the scope of the present application.

In the several embodiments provided in the present application, it should be understood that, the disclosed system and apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual coupling or direct coupling or communication connection may be indirect coupling or communication connection through some interfaces, apparatuses or units, and may also be electrical, mechanical, or connection in other forms.

The units described as separate parts may or may not be physically separate, and parts displayed as units may or may not be physical units, may be located in one position, or may be distributed on multiple network units. Part of or all of the units here may be selected according to a practical need to achieve the objectives of the solutions of the embodiments of the present application.

In addition, functional units in the embodiments of the present application may be integrated into a processing unit, or each unit may exist alone physically, or two or more than two units may be integrated into one unit. The integrated unit may be implemented in a form of hardware, or may be implemented in a form of a software functional unit.

If being implemented in the form of a software functional unit and sold or used as a separate product, the integrated unit may be stored in a computer-readable storage medium. Based on such understanding, the nature of the technical solutions of the present application, or the part contributing to the prior art, or all of or part of the technical solutions may be implemented in a form of software product. The computer software product is stored in a storage medium and includes several instructions for instructing a computer device (which may be a personal computer, a server, or a network device, and the like) to execute all of or part of the steps of the method described in the embodiments of the present application. The storage medium includes: various media that may store program codes, such as a U-disk, a removable hard disk, a read-only memory (ROM), a random access memory (RAM), a magnetic disk, a compact disk, and so on.

The foregoing descriptions are merely specific implementations of the present disclosure. The protection scope of the present application, however, is not limited thereto. Various equivalent modifications or replacements may be readily conceivable to any person skilled in the art within the technical scope disclosed in the present application, and such modifications or replacements shall fall within the protection scope of the present application. Therefore, the protection scope of the present application shall be subject to the protection scope of the claims.

What is claimed is:

1. An under-screen biometric identification apparatus, applicable to an electronic device having a display screen, the under-screen biometric identification apparatus comprising:
   a lens unit, comprising at least one aspherical lens, structured to be disposed under a display screen for receiving an optical signal generated when light reflected at a finger above the display screen, wherein the optical signal is used to detect biometric information of the finger; and
   a sensing chip, comprising an optical sensing array having a plurality of optical sensing unit, structured to be disposed under the lens unit, the sensing chip being configured for implementing optical imaging based on the optical signal passing through the lens unit, wherein a distance between a photosurface of the sensing chip and an imaging surface of the lens unit is greater than or equal to a preset value to enable the sensing chip to operate in a defocusing state.

2. The under-screen biometric identification apparatus according to claim 1, wherein the defocusing state refers to that the sensing chip is capable of obtaining imaging of the optical signal corresponding to light reflection of the finger on the photosurface thereof, while an optical signal corresponding to an internal structure of the display screen is incapable of being imaged on the photosurface of the sensing chip.

3. The under-screen biometric identification apparatus according to claim 2, wherein the preset value is 10 μm.

4. The under-screen biometric identification apparatus according to claim 3, wherein a lower surface of the lens barrel extends downward at a barrel opening of the lens barrel to form a first fixing structure, the lower surface of the lens barrel extends downward at an edge of the lens barrel to form a second fixing structure, the lens barrel forms a cavity between the first fixing structure and the second fixing structure, and the lens unit is fixed in the first fixing structure.

5. The under-screen biometric identification apparatus according to claim 4, wherein an upper surface of the first fixing structure extends inward at the barrel opening of the lens barrel to form a first convex structure, and the first convex structure is used for fixing the lens unit.

6. The under-screen biometric identification apparatus according to claim 1, wherein the imaging surface of the lens is located above or below the photosurface of the sensing chip.

7. The under-screen biometric identification apparatus according to claim 1, further comprising: a lens barrel arranged above the sensing chip and structured to accommodating and fixing the lens unit.

8. The under-screen biometric identification apparatus according to claim 7, wherein the under-screen biometric identification apparatus further comprises:
   a lens base for supporting the lens barrel; wherein the lens base and the lens barrel are integrated into a one-piece structure or formed by two separate components.

9. The under-screen biometric identification apparatus according to claim 8, wherein a dispensing structure is formed between the lens base and the lens barrel, and the lens base and the lens barrel are fixed by means of dispensing glue in the dispensing structure.

10. The under-screen biometric identification apparatus according to claim 9, wherein the dispensing structure comprises: a second step structure formed by an upper surface of the lens base extending downward in a peripheral area close to the lens barrel.

11. The under-screen biometric identification apparatus according to claim 8, wherein the under-screen biometric identification apparatus further comprises:
   a fixing support, wherein the lens base is fixed under the display screen by the fixing support such that a distance between an upper surface of the display screen and an optical center of the lens unit satisfies an imaging condition.

12. The under-screen biometric identification apparatus according to claim 11, wherein the fixing support is a middle frame of the electronic device, and the middle frame is used for supporting the display screen.

13. The under-screen biometric identification apparatus according to claim 12, wherein the middle frame is provided with a hole, the lens barrel is at least partially accommodated in the hole, and there is a gap between an outer side of the lens barrel and an inner side of the hole; wherein an upper surface of the middle frame is provided with a bevel angle formed by chamfering processing at an edge of the hole, and the bevel angle enables a width of the hole on the upper surface of the middle frame to be larger than a width of the hole on a lower surface of the middle frame.

14. The under-screen biometric identification apparatus according to claim 1, wherein the lens is a macro lens, wherein a focal length of the macro lens ranges from 0.4 mm to 1.8 mm.

15. An electronic device, comprising:
   a display screen and an under-screen biometric identification apparatus according to any one of claims 1;
   wherein a biometric capturing area of the under-screen biometric identification apparatus is at least partially located in a display area of the display screen.

16. The electronic device according to claim 15, wherein the electronic device further comprises: a middle frame, wherein the under-screen biometric identification apparatus is assembled under the display screen through the middle frame so that there is a gap between the under-screen biometric identification apparatus and the display screen.

17. The electronic device according to claim 16, wherein the electronic device further comprises a screen component flexible circuit board, the screen component flexible circuit board is located between the display screen and the middle frame, and the screen component flexible circuit board and the middle frame are sealed and fixed by a compressible foam that is provided with an adhesive on at least one side.

18. The electronic device according to claim 17, wherein if the foam is provided with adhesives on two sides, viscosity of an adhesive for bonding and attaching the foam and the screen component flexible circuit board is weaker than viscosity of an adhesive for bonding and attaching the foam and the middle frame.

19. The electronic device according to claim 18, wherein a compression percentage of the foam is greater than 50%.

20. An under-screen biometric identification apparatus, applicable to an electronic device having a display screen, the under-screen biometric identification apparatus comprising:
   a lens unit, comprising at least one aspherical lens, structured to be disposed under a display screen for receiving an optical signal generated when a finger above the display screen is illuminated by light emitted from the display screen, wherein the optical signal is used to detect biometric information of the finger; and a sensing chip, comprising an optical sensing array having a plurality of optical sensing unit, the sensing chip being structured to be disposed under the lens unit; wherein the light passing through the lens unit is focused to the optical sensing array of the sensing chip, and the sensing chip is configured for implementing optical imaging based on the optical signal;

wherein a distance between a photosurface of the sensing chip and an imaging surface of the lens unit is greater than or equal to a preset value to enable the sensing chip to operate in a defocusing state, such that the optical signal corresponding to light reflection of the finger is well-imaged on the photosurface of the sensing chip, while an optical signal corresponding to an internal structure of the display screen is incapable of being imaged on the photosurface of the sensing chip.

* * * * *